(12) United States Patent
Flaig et al.

(10) Patent No.: US 6,610,940 B2
(45) Date of Patent: Aug. 26, 2003

(54) MECHANICAL ACCELERATION SENSOR

(75) Inventors: Thomas Flaig, Radolfzell (DE); Robert Skofljanec, Moos-Bankholzen (DE)

(73) Assignee: TRW Automotive Electronics & Components GmbH & Co. KG, Radolfzell (DE)

( * ) Notice: Subject to any disclaimer, the term of this patent is extended or adjusted under 35 U.S.C. 154(b) by 0 days.

(21) Appl. No.: 10/023,551

(22) Filed: Dec. 17, 2001

(65) Prior Publication Data
US 2002/0084176 A1 Jul. 4, 2002

(30) Foreign Application Priority Data
Dec. 20, 2000 (DE) .................................. 200 21 531 U

(51) Int. Cl.[7] .............................................. H01M 35/02
(52) U.S. Cl. .............................................. 200/61.45 R
(58) Field of Search .................. 200/61.45 R, 61.45 M, 200/61.48, 61.49–61.53

(56) References Cited

U.S. PATENT DOCUMENTS

| 4,191,869 A | 3/1980 | Tanaka et al. |
| 5,231,253 A | 7/1993 | Breed et al. |
| 5,415,043 A | 5/1995 | Zabler et al. |
| 5,496,979 A * | 3/1996 | Behr .................. 200/61.45 M |
| 5,559,309 A | 9/1996 | Zabler et al. |
| 6,184,764 B1 * | 2/2001 | Edwards et al. ...... 200/61.45 R |

FOREIGN PATENT DOCUMENTS

| DE | 2831760 A1 | 2/1979 | |
| DE | 3713698 | * 4/1987 | .......... H01H/35/14 |
| DE | 3713698 C1 | 7/1988 | |
| DE | 4126107 A1 | 2/1993 | |
| DE | 4229068 A1 | 3/1994 | |
| GB | 2343952 A | 5/2000 | |
| JP | 09099806 | 4/1997 | |

* cited by examiner

*Primary Examiner*—Elvin Enad
*Assistant Examiner*—Marina Fishman
(74) *Attorney, Agent, or Firm*—Tarolli, Sundheim, Covell & Tummino L.L.P.

(57) ABSTRACT

A switch includes a deflectable inertial mass that responds to acceleration. The inertial mass is for activating a switching system. The inertial mass is suspended on two parallel, elastically deflectable support arms having a first, firmly anchored end and a second, movable end to which the inertial mass is attached.

15 Claims, 4 Drawing Sheets

MECHANICAL ACCELERATION SENSOR

The present invention relates to a switch comprising a deflectable inertial mass that responds to acceleration, by means of which a switching system can be actuated.

BACKGROUND OF THE INVENTION

Such switches are needed in vehicles so that the activation of restraint systems is only triggered when a (negative) acceleration is detected that indicates a vehicle collision. Extremely high demands have to be made of the functional reliability of such a switch.

DE 195 18 824 C1 already discloses a switch of this type including an inertial mass which is guided so as to move in a guide housing and is spring-loaded to a resting position. The inertial mass is configured so as to be of revolution or spherical. The inertial mass actuates an electric contact pair which, in turn, is biassed to a resting position. In a first movement phase, the inertial mass only approaches the electric contact pair. Only when its higher restoring force, in addition to the spring that presses against the inertial mass, has been overcome is the contact made. In this manner, a reliable contact is made over a predefined time duration without contact bounces.

With other known switches, mechanical actuation systems with a snap effect or with magnetically actuated switching elements are used. All of the known solutions have in common that, in order to achieve reliable and reproducible switching behavior, they require a complex structure and/or a critical adjustment.

SUMMARY OF THE INVENTION

The present invention provides a switch that, with just a few simple components, ensures a reliable and readily reproducible switching function without any requirement for adjustment.

The switch according to the invention comprises a deflectable inertial mass that responds to acceleration, by means of which a switching system can be actuated. The inertial mass is suspended on two parallel, elastically deflectable support arms each having a first, firmly anchored end and a second, movable end to which the inertial mass is attached. The two elastically deflectable support arms form a guide parallelogram that, when the inertial mass is deflected, forces it to make an essentially parallel movement and, at the same time, it exerts a restoring force. Since the inertial mass is preferably secured between the support arms with a gap on both sides, it does not touch any other components when it is deflected, so that its movement is not hindered by any friction whatsoever.

Conventional switches to trigger the activation of restraint systems in vehicles can only respond to acceleration in one direction. Normally, they are designed for front-impact collisions. The switch according to the invention, however, makes it possible in an extremely simple manner to actuate two switching systems, one for frontal collisions and one for rear-end collisions, since the inertial mass can be deflected in two opposite directions.

Preferably, the switch is built on a baseplate in which the unmovable ends of the support arms are anchored. The inertial mass with the bearings and the switching system are enclosed by a hood-like housing that is connected to the circumferential edge of the baseplate. Contact pins are also anchored in the baseplate and they allow the direct attachment of the switch contact members onto a printed circuit board The switch can be quite compact in design. In the case of a parallelepipedal housing, the edge length can be less than 20 mm.

With the configuration of the switch according to the invention, multifaceted forms and arrangements of switching systems can be used In the simplest case, the inertial mass has an actuation arm that engages a spring contact element In this case, preferably a normally closed contact pair is used which is held in its open position by the actuation arm of the inertial mass, as long as the inertial mass is in its non-deflected resting state and, when the inertial mass is deflected, the actuation arm is retracted and the contact pair automatically assumes the closed position. Movement of the inertial mass then no longer has any influence on the switching behavior of the switching system. It only determines the status of the switching system, i.e. on or off.

When higher demands are placed on the functionality of the switch, then more complex switching systems can be used, for example, optical or magnetic switching units. Aside from the elementary switching function, these units can generate additional switching signals for various purposes, especially for signals that can also be used for diagnostic purposes.

BRIEF DESCRIPTION OF THE DRAWINGS

Additional advantages and features of the invention ensue from the following description and from the appended drawings to which reference is made. The drawings show the following.

DESCRIPTION OF THE PREFERRED EMBODIMENTS

Figure 1:
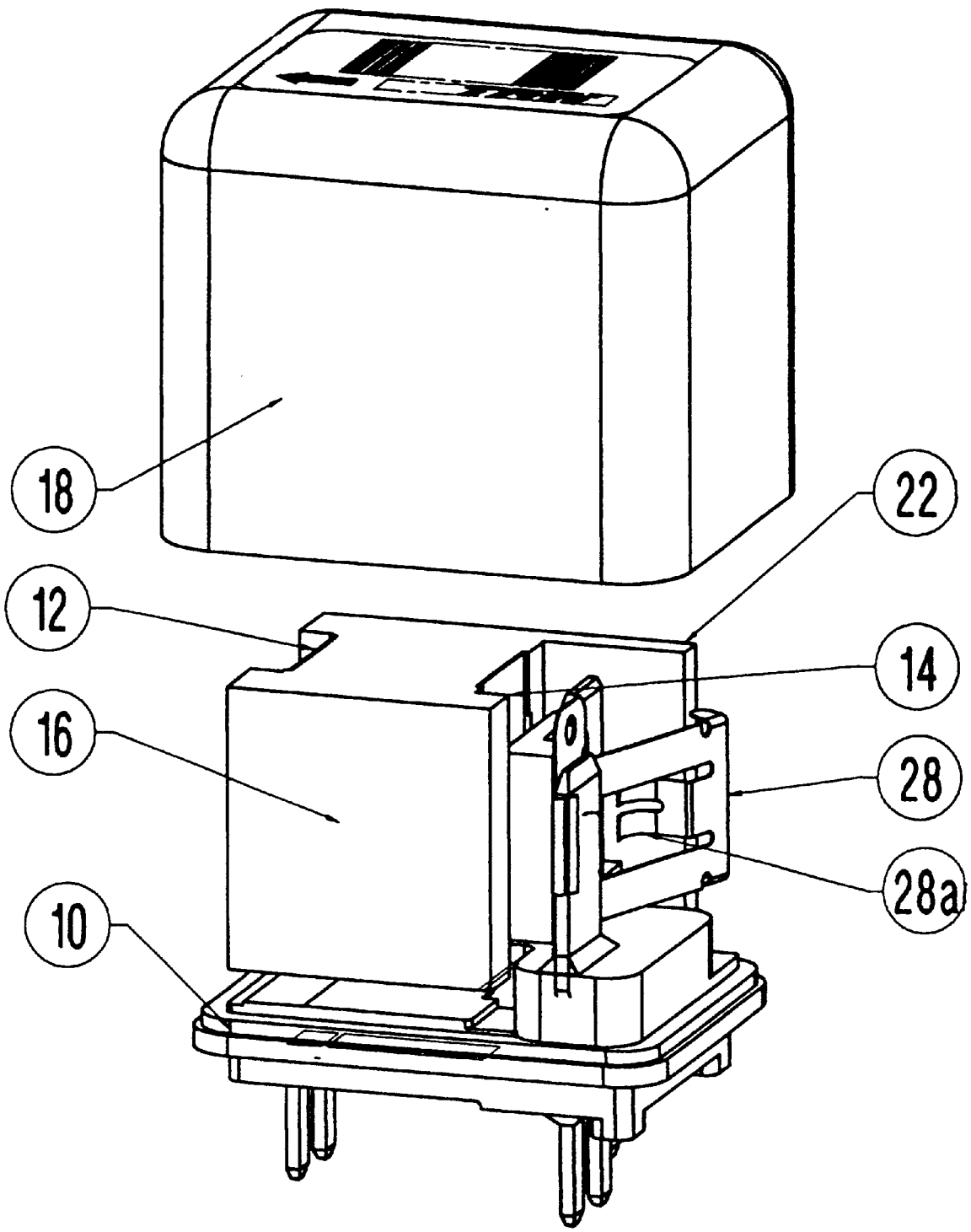
FIG. 1—a perspective overall view of a switch according to the invention, with the hood removed.
Figure 2:
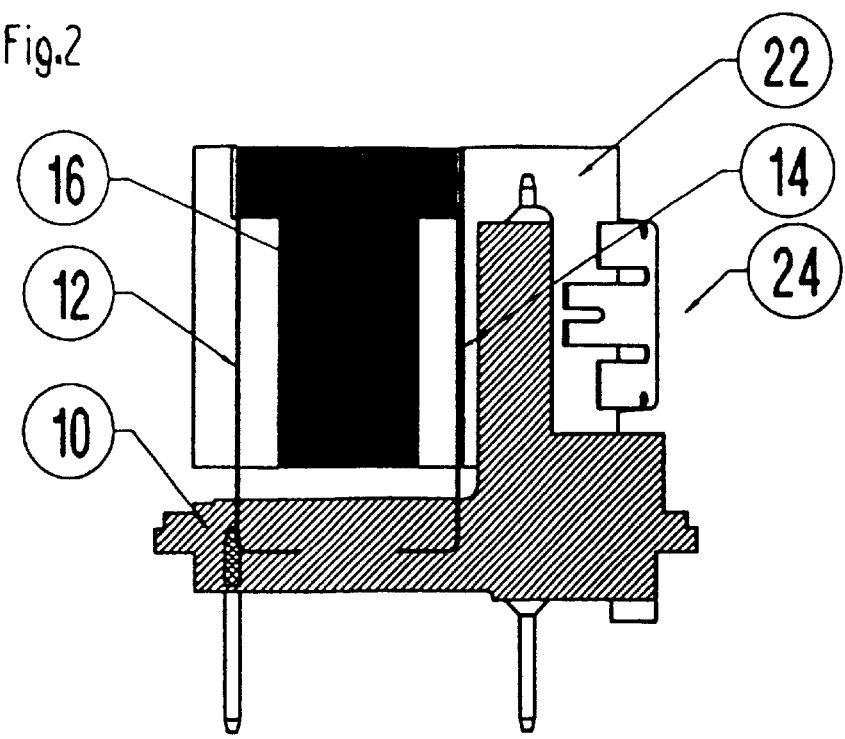
FIG. 2—a schematic sectional side view of the switch in the resting state, with the hood removed.

The switch has a generally rectangular baseplate 10 made of plastics material. The lower ends of two parallel, vertically upright support arms 12, 14 are anchored in the baseplate 10. In the embodiment shown in FIG. 2, the ends of the support arms 12, 14 anchored in the baseplate 10 are bent and are completely embedded in the material of the baseplate. The support arms 12, 14 are elastically deflectable and are made of spring steel or of a suitable plastics material. An inertial mass 16 is attached to the upper ends of the support arms 12, 14. The inertial mass 16 is generally parallelepipedal in the embodiment shown here. The support arms 12, 14 form a parallelogram for guiding the inertial mass 16 which is suspended at the upper ends of the support arms 12, 14. Since the support arms 12, 14 are spaced on both sides from the inertial mass 16, the inertial mass can be deflected under the influence of forces of inertia in two opposite directions, the inertial mass being guided by the support arms so as to be able to perform an essentially parallel movement and, at the same time, urged into a resting position by a restoring force.

Figure 3:
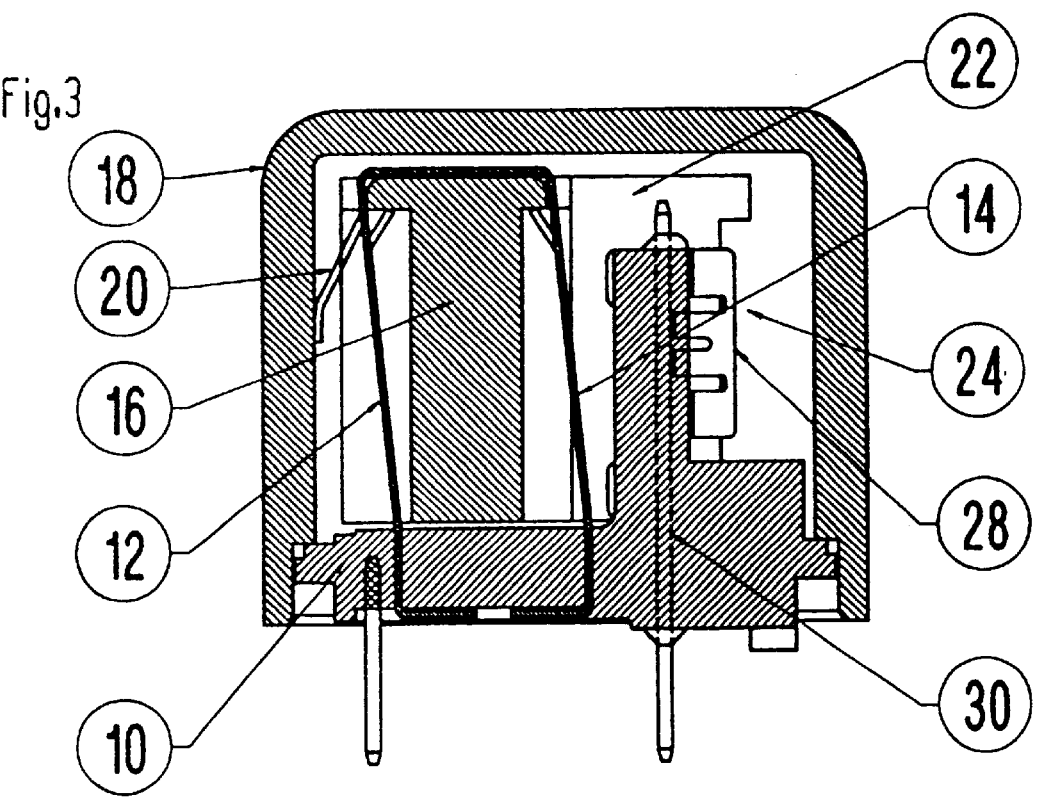
FIG. 3—a sectional side view of the switch in the activated state, with the hood put in place.

FIG. 3 shows an embodiment that has been modified in the area where the support arms 12, 14 are anchored in the baseplate 10. According to this embodiment, the support arms also form an almost closed bracket that surrounds the inertial mass 16. FIG. 3 shows the inertial mass 16 in the deflected state. Furthermore, FIG. 3 shows a hood 18 that surrounds the switch and that is attached to the circumferential edge of the baseplate 10. In order to prevent any contact of the inertial mass 16 with the inner surface of the hood 18, a leaf spring-like stop element 20 is provided.

Figure 4A:
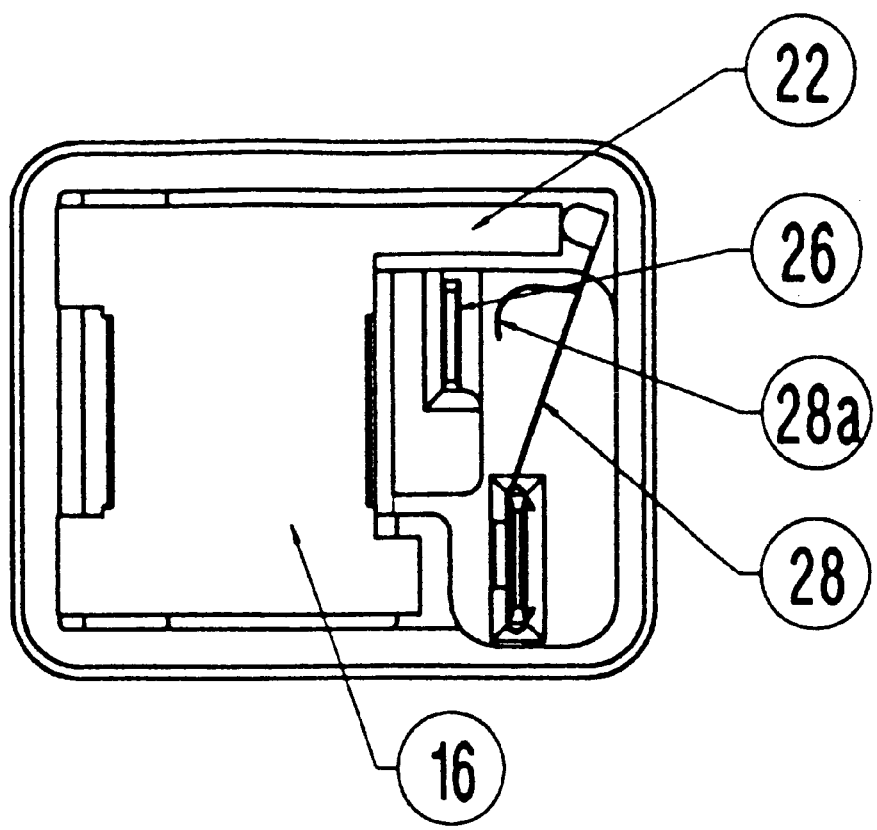
FIGS. 4a and 4b—top views of the switch, with the hood removed in the resting state and in the activated state.
Figure 4B:
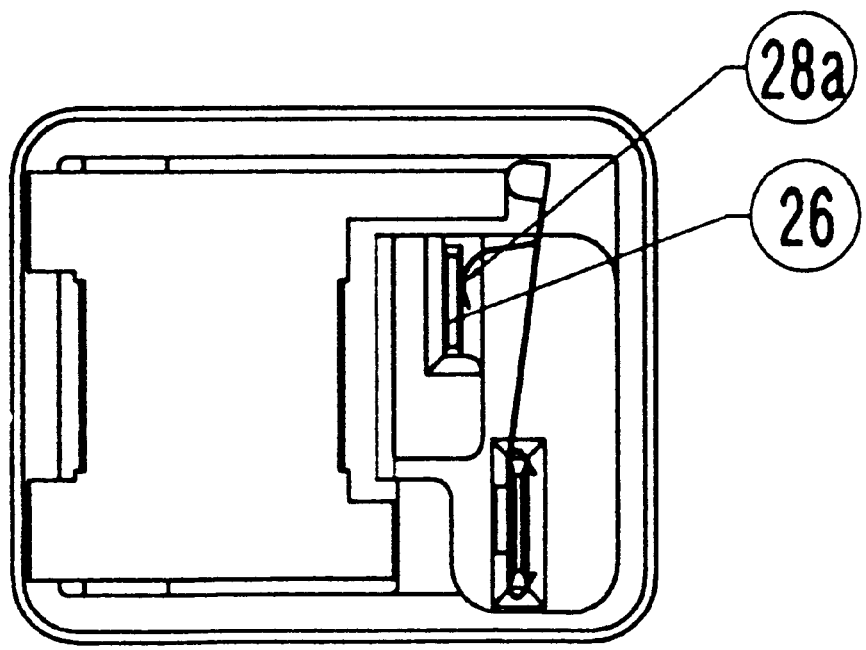

The inertial mass 16 has an integrally molded actuation arm 22 for actuating a switching system generally designated with the reference numeral 24. In the embodiment shown, the switching system 24 consists of a fixed contact member 26 supported on the inside of the baseplate 10, from which contact member a contact pin extends downwards through the baseplate 10, and the switching system further consists of a movable contact member 28 that is configured as a spring bracket and that is attached to a contact pin 30 that likewise extends through the baseplate 10. The movable contact member 28 has a curved contact tag 28a that cooperates with the fixed contact member 26. The movable contact member 28 is spring-loaded towards the fixed contact member 26 and is held in the open position by the actuation arm 22 of the inertial mass 16 as long as the inertial mass 16 is in the non-deflected resting state. This state is shown in FIG. 4a. When the inertial mass 16 moves into the deflected position as a result of inertia of masses (FIG. 3), the actuation arm 22 releases the movable contact member 28 so that its contact tag 28a comes into contact with the fixed contact member 26, as shown in FIG. 4b.

Since the inertial mass 16 is completely free, except for its attachment on the upper ends of the support arms 12, 14, its movement is not impaired by any detrimental influences such as friction or hysteresis effects. The switching behavior of the switching system 24 is only determined by the properties of the movable contact member 28 since the inertial mass 16 merely opens the switching system with its actuation arm 22 and making contact is only determined by the elasticity of the movable contact member. It can be seen that extremely simple means and few components result in a reliable, reproducible switching function that does not require any adjustment work.

Figure 5:
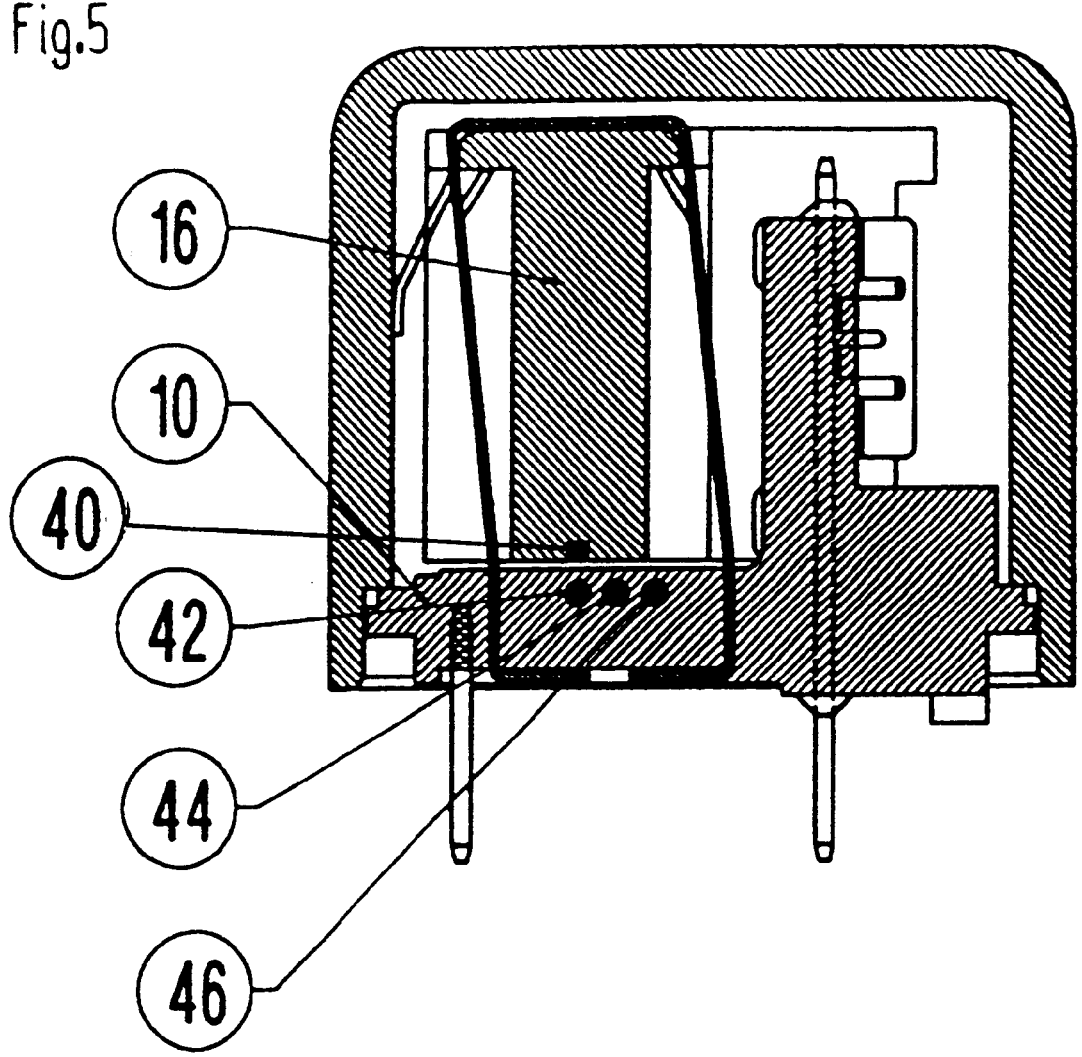
FIG. 5—schematic sectional view of another embodiment.

In the embodiment shown in FIG. 5, only the switching system differs from the previously described embodiment. Here, this is realized by a permanent magnet 40 embedded in the inertial mass 16 and by three Reed switching units 42, 44, 46 embedded in the baseplate 10. The arrangement of Reed switching units 42, 44, 46 corresponds to the positions of the inertial mass 16 that are to be detected. In the embodiment shown, the middle resting position as well as each of the two activated positions of the inertial mass 16 deflected in opposite directions can be detected. In the deflection position of the inertial mass 16 shown in FIG. 5, the permanent magnet 40 is located vertically above the Reed switching unit 42, which is closed thereby. In the resting position of the inertial mass 16, the permanent magnet 40 is located vertically above the Reed switching unit 44, which is then closed. Finally, the permanent magnet 40 is located in the opposite deflection position, which can correspond to a rear-end collision of the vehicle, vertically above the Reed switching unit 46, which is then closed.

Numerous other embodiments of the switching system are possible. In particular, optical solutions with a light barrier or reflector can be implemented, and so can magnetic systems with Hall elements.

In an especially advantageous embodiment, all or almost all of the components of the switch are made by means of a two-component injection-molding technique. One of the two plastics material components can be metallized and receives a metal layer at the necessary places. The thickness of the metal layer determines the functional properties of the switch, especially the mass of the inertial mass and the spring constant of the support arms, and consequently the triggering threshold of the switch. Since the switch is a uniform injection-molded part, it is possible to dispense with all assembly steps. Instead of the contact pins in the previously described embodiments, the baseplate has metallized contact areas so that the switch, as an SMD component (surface-mounted device), can be mounted and soldered directly onto a printed circuit board.

What is claimed is:

1. A switch comprising a deflectable inertial mass that responds to acceleration and a switching system adapted to be actuated by said mass, said mass being suspended on two parallel, elastically deflectable support arms each having a first, firmly anchored end and a second, movable end to which said mass is attached, said inertial mass being deflectable between a resting position and at least one deflected position, and said inertial mass being secured between said support arms with a gap on each of two opposed sides of said mass in said resting position of said mass.

2. The switch according to claim 1, wherein said inertial mass, starting from said resting position, can be deflected in two opposite directions.

3. The switch according to claim 1, wherein said inertial mass has a magnetic actuation element.

4. The switch according to claim 1, wherein said inertial mass has an optical actuation element.

5. The switch according to claim 1, wherein said switching system has a plurality of switching units that are each associated with different positions of said inertial mass.

6. The switch according to claim 5, wherein one of said switching units is associated with said non-deflected resting position of said inertial mass.

7. The switch according to claim 5, wherein each of two opposite deflection positions of said inertial mass is associated with one switching unit.

8. The switch according to claim 1, wherein said support arms form a continuous bracket that surrounds said inertial mass.

9. The switch according to claim 8, wherein first ends of said support arms are anchored in a base plate.

10. The switch according to claim 9, wherein said inertial mass and said switching system are enclosed by a hood that is attached to the periphery of said base plate.

11. The switch according to claim 10, wherein a resilient stop element is arranged between said inertial mass and said inner surface of said hood.

12. The switch according to claim 9, wherein at least one of said base plate, said inertial mass and said support arms are made by means of a two-component injection-molding technique, one of said components being a plastic material that can be metallized, and at least portions of said plastic materials that can be metallized having a metal layer deposited thereon.

13. A switch comprising a deflectable inertial mass that responds to acceleration and a switching system adapted to be actuated by said mass, said mass being suspended on two parallel, elastically deflectable support arms each having a first, firmly anchored end and a second, movable end to which said mass is attached, said inertial mass having an actuation arm for said switching system, said actuation arm engaging an electromechanical contact pair, said contact pair being a normally closed contact pair, that is spring-loaded into a closed position and that is held in an open position by engagement with said actuation arm of said non-deflected inertial mass.

14. The switch according to claim 13, wherein said contact pair has a first, fixed contact member attached to a contact pin and a second, movable contact spring element.

15. The switch according to claim 14, wherein said contact pin is anchored in a carrier base.

* * * * *